UNITED STATES PATENT OFFICE 2,524,675

CYANINE SENSITIZING DYES

Edmund B. Middleton, Wilmington, Del., assignor to E. I. du Pont de Nemours & Company, Wilmington, Del., a corporation of Delaware No Drawing. Original application May 15, 1943, Serial No. 487,138. Divided and this application June 26, 1948, Serial No. 35,523

4 Claims. (Cl. 260—240.1)

The invention described below relates to new organic chemical compounds and their preparation and use. More particularly, it relates to new dyestuff intermediates, dyes, and the preparation and use thereof. Still more particularly it relates to cyanine dyestuffs.

It is an object of this invention to provide new organic chemical compounds. A further object is to provide a new group of photographic sensitizing dyes. A still further object is to provide a group of cyanine type sensitizing dyes which increase over-all sensitivity and confer a useful range of extra sensitivity to silver halide emulsions. Other objects will be apparent from the following detailed description of the invention.

This case is a divisional applicaton based on Middleton application Serial No. 487,138, filed May 15, 1943.

It has been found that 2-methyl thiazoles which have attached to the 4-position a benzofuryl nucleus and which may be substituted in the 5-position may be prepared and constitute useful organic intermediates, particularly dye intermediates. They may be converted into cycloammonium or quaternary salts by reaction with a salt-forming agent. By reason of the reactive methyl group in the alpha position to the heterocyclic nitrogen atom, they can be condensed to form cyanine dyes of utility as commercially practical sensitizing dyes.

The novel dye intermediates of this invention in the base form have the general formula:

(1)
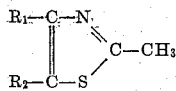
C—CH₃ wherein $R_1$ is a benzofurane nucleus which is attached to the 4-position of the thiazole ring in the alpha position to the oxygen atom of the furane nucleus; $R_2$ is a benzofurane nucleus similar to $R_1$ or a hydrogen atom, hydrocarbon radical or carbalkoxy group.

The compounds of Formula 1 can be prepared by reacting a benzofuryl ketone having an acyclic carbon atom with at least 2 hydrogen atoms directly attached to the carboxyl group with a brominating agent and reacting the alpha bromo ketone derivative formed with thioacetamide. The reactions may be illustrated by the following equations:

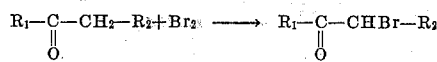

and (2)

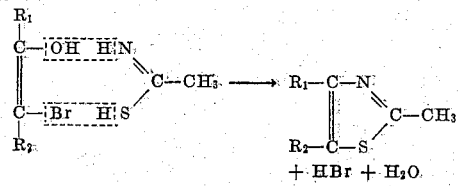

In the above formulae $R_1$ is a benzofurane nucleus which is joined to the rest of the compound in question through an alpha carbon atom of such nucleus. $R_2$ is hydrogen, a hydrocarbon radical, carbethoxy, or is the same as $R_1$.

The benzofuryl thiazoles of Formula 2 can be converted into cycloammonium salts in a simple manner by reacting them with a quaternizing or salt-forming agent such as an alkyl salt or an ester of an alcohol radical and a suitable acid such as an alkyl halide, nitrate, perchlorate, p-toluene sulfonate, and sulfamate, etc. The cycloammonium salts have the general formula:

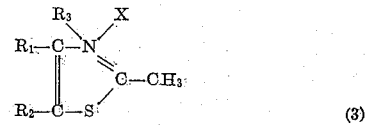

(3)

wherein $R_1$ and $R_2$ have the same significance as in Formulas 1 and 2. $R_3$ is an aliphatic hydrocarbon radical and X is the negative radical of an acid.

The compounds of Formula 3 in accordance with one aspect of this invention, may be converted into cyanine type dyes by a condensation reaction. Both symmetrical and unsymmetrical dyes can be prepared. If one mol of a quaternary salt of a known heterocyclic base containing a reactive group of the type used in the preparation of cyanine dyes is used per mol of Formula 3 salt unsymmetrical dyes may be formed. If the condensations are effected with the use of a carboxylic acid and beta ethoxyacroleinacetals, tri- and penta-methine-cyanines are formed.

To be more specific, cyanine dyes of the unsymmetrical type which are bridged by a methenyl radical (—CH=) may be prepared by reacting a compound of Formula 3 with a heterocyclic nitrogen salt of the type used in cyanine dyes having a reactive methyl or a reactive thioether group in an alpha or gamma position to a heterocyclic nitrogen atom. Such compounds include the quaternary salts of the unsubstituted thioethers or alpha or gamma methyl thiazoles, thiazolines, oxazoles, or azolines, selenazoles, selenazolines, pyridines, quinolines, indolenines, dialkylindolenines; e. g., dimethyl- and diethylindolenines, and iminazoles, including the corresponding polycyclic compounds such as benzthiazoles, naphthiazoles, and anthrathiazoles.

When ortho esters are used in the condensations to make trimethine cyanines, they may be of aliphatic or aromatic carboxylic acids. The ortho esters of the acids result in carbocyanine dyes which comprise two heterocyclic nitrogen nuclei bridged by a trimethenyl radical

—CH=CH—CH= or by a substituted trimethenyl radical of the formula:

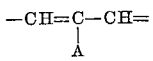

wherein A is a hydrocarbon radical. In the case of aliphatic carboxylic acids having more than 1 carbon atom in the molecule, A becomes an alkyl radical. When an ortho ester of an aromatic carboxylic acid is used, A is an aryl radical. When ortho formate esters are used, A is hydrogen. However, neocyanine type dyes may also be formed wherein A is a benzofurylthiazole dimethenyl radical.

The dyes produced may be added to a photographic emulsion or layer and confer valuable sensitizing properties thereto. They may be brought into intimate contact with the silver halide grains thereof by dispersing the compounds in the silver halide coating compositions or emulsions before coating to form photosensitive layers or subsequently by bathing or impregnating the layer with the dyes. It is convenient to add the dyes to the emulsions from a solution in a solvent which is compatible with the emulsion, free from deleterious action on the light sensitive material and capable of dissolving the dyes. Methanol, ethanol, and acetone are suitable solvents.

The concentration of the dyes in the emulsions can vary widely, e. g., from about 2 to 100 mg. per liter of ordinary flowable gelatino-silver-halide emulsion. The concentration of dye will vary according to the type of light sensitive materials employed in the emulsion and according to the effects desired. The suitable and most economical concentration for any given emulsion will be apparent to those skilled in the art, upon making ordinary tests and observations customarily employed in the art of emulsion making. To prepare a gelatino-silver-halide emulsion, the following procedure is satisfactory: A quantity of the dye is dissolved in methyl alcohol or acetone and a volume of this solution (which may be diluted with water) containing from 2 to 100 mg. of dye is slowly added to 1000 cc. of a flowable gelatino-silver-halide emulsion with stirring. Stirring is continued until the dye is thoroughly incorporated in the emulsion. Ordinarily from 10 to 20 mgs. of the dyes per liter of emulsion suffice to produce the maximum effect.

The invention will be further illustrated but is not intended to be limited by the following examples wherein the parts stated are parts by weight:

Example I

Four parts of 2-acetyl-coumarone (prepared according to Stoerner: Ber. (30) 1711) were dissolved in 20 parts of carbon disulfide and treated with 4 parts of bromine dissolved in 20 parts of carbon disulfide. The bromine solution was added drop by drop while a current of $CO_2$ was passed through the solution to help stir the solution and sweep out the HBr which was formed. After the addition was completed, the solution was allowed to stand for 30 minutes and then the HBr and $CS_2$ were removed by distillation. Two hundred ccs. of absolute alcohol were added and the solution warmed to reflux. At this temperature, small portions of thio-acetamide were added until two parts of this material had been introduced into the reaction vessel. After the reaction appeared to be completed, the large portion of the alcohol was removed by distillation and three volumes of water were added to the residuum. The solution was made alkaline with sodium carbonate whereupon an oil separated that was taken up in ether. The ether extract was dried over anhydrous potassium carbonate and the ether evaporated. The crystalline residue was dissolved in alcohol, purified with charcoal and recrystallized. Three and four-tenths parts of sparkling yellow crystals were obtained thought to have the following formula:

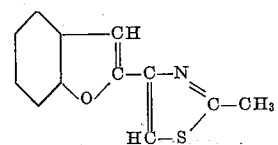

Example II

One and seven hundredths parts of 2-methyl-4-α-benzofuryl thiazole and one part of ethyl p-toluene sulfonate were heated together for 6 hours at 130°–140°. After cooling, 10 parts of dry pyridine and 2.5 parts of ethyl-ortho-formate were added and the whole mixture heated to reflux for 30 minutes. The hot solution was then treated with saturated, aqueous potassium iodide solution whereupon crystallization took place. Fractional crystallization of the product produced a more soluble fraction having a magenta color. This was crystallized twice, producing dark green crystals believed to have the following formula:

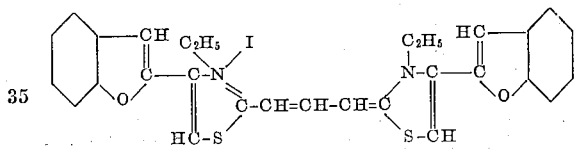

Thirty milligrams of this dye added to a liter of the bromide emulsion extended the sensitivity strongly to 6600 Å. with a maximum at 6200 Å. Forty-five milligrams of the dye in a liter of a silver chloride emulsion gave similar sensitization.

The least soluble fraction obtained by fractional crystallization was recrystallized twice from alcohol. Dark purple crystals were obtained thought to have the following formula:

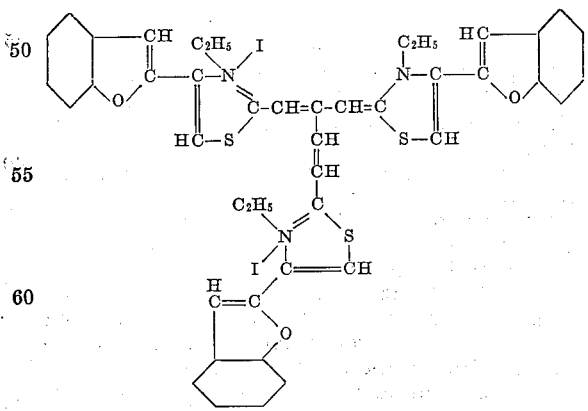

Example III

Ten parts of 2-methyl-4-α-benzofuryl thiazole ethiodide prepared as described in Examples I and II by substituting ethyl iodide for the ethyl p-toluene sulfonate were mixed with 50 parts of absolute alcohol together with 8 parts of 2-methyl-mercapto-quinoline ethyl p-toluene sulfonate and 5 parts of triethylamine. The mixture was heated to reflux for approximately two minutes and then cooled. Bright orange crystals were precipitated. These were filtered off, washed with water and with ether and then recrystallized twice from alcohol. About 2.5 parts of dye were obtained believed to correspond to the following formula:

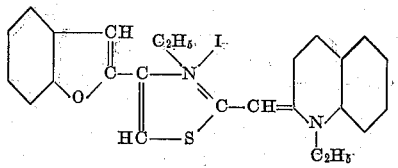

The dye was tested in a silver bromide emulsion. The dye sensitized to 5800 Å. with a maximum at 5400 Å. When tested, the dye sensitized a silver chloride emulsion to 5800 Å. with a strong maximum at 5500 Å.

*Example IV*

The process of the preceding example was repeated, substituting an equivalent quantity of the salt derived from 2-methyl-mercapto-6-methoxy quinoline and diethyl sulfate for the quinoline salt employed therein. Orange-red crystals were obtained thought to correspond to the following formula:

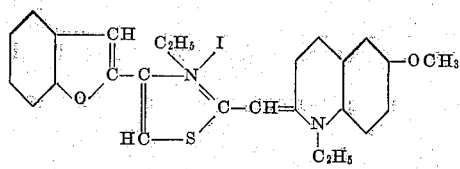

*Example V*

Ten parts of 2-methyl-4-α-benzofuryl thiazole and 9.3 parts of ethyl p-toluene sulfonate were heated together for 4 hours at 140–150° C. Twenty parts of 2-methyl-mercapto-6-methyl quinoline ethiodide were added to the resulting product along with a small quantity of alcohol and 4.65 parts of triethylamine. The mixture was heated to reflux until an orange color formed and a dye crystallized from solution. The dye was removed from solution, washed with water and recrystallized twice from alcohol. A product was obtained believed to have the following formula:

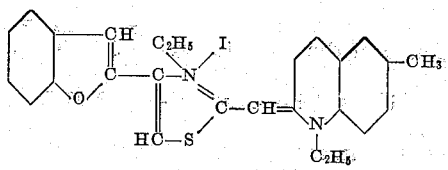

*Example VI*

Nine parts of 2-methyl-4-α-benzofuryl thiazole ethiodide are mixed with ten parts of 2-anilido-vinyl-benzothiazole ethiodide and 150 parts of dry pyridine. The mixture was refluxed for 20 minutes and then cooled, crystals separating from the solution on standing. The crystalline product was recrystallized twice from alcohol. Approximately 5 parts of purple crystals were obtained thought to have the following formula:

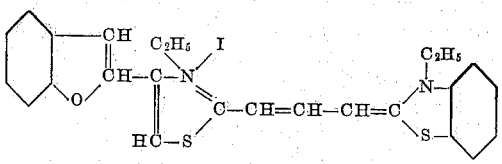

When tested, the dye sensitized a bromide emulsion to 6600 Å, with a maximum at 6200 Å. When tested in a chloride emulsion, the dye sensitized the emulsion from 4600 Å. to 6600 Å. with a maximum at 6100 Å.

*Example VII*

The process of Example VI was repeated substituting an equivalent quantity of 2-anilido-vinyl-benzoselenazole ethyl iodide for the 2-anilido - vinyl - benzothiazole ethiodide employed therein. About 2 parts of dark green crystals were obtained thought to correspond to the following formula:

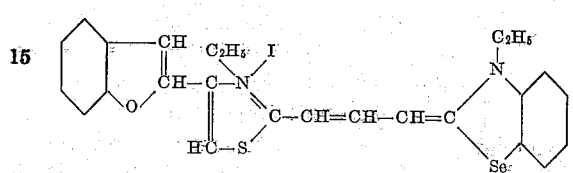

The dye extended the sensitivity of a silver bromide emulsion to 6500 Å. The sensitivity of a chloride emulsion was extended to 6700 Å. with a maximum at 6200 Å.

*Example VIII*

Example VI was repeated substituting an equivalent quantity of 2-anilido-vinyl-alpha-naphthothiazole ethiodide for the benzothiazole compound thereof. About 3.5 parts of golden brown crystals were obtained believed to have the following formula:

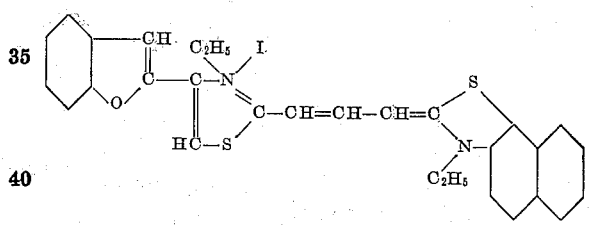

The dye extended the sensitivity of a silver bromide emulsion to 6600 Å. with maxima at 4700 Å. and 6300 Å. In a silver chloride emulsion, the dye extends the sensitivity to 6700 Å. with a maximum at 6300 Å.

*Example IX*

A dye was prepared in similar fashion to the dye of Example VI, substituting an equivalent quantity of 2-anilido-vinyl quinoline ethyl iodide for the benzothiazole compound employed therein. Four and five tenths parts of grayish black dye crystals were obtained having the following probable formula:

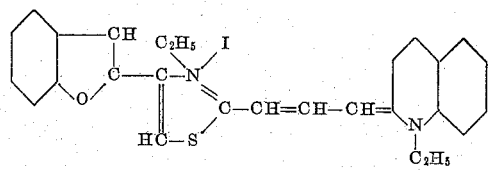

Tested in a silver bromide emulsion, the dye extended the sensitivity to 6900 Å. with a maximum at 6400 Å. In a silver chloride emulsion, the dye sensitized from 4800 Å. to 6900 Å. with a maximum at 6400 Å.

*Example X*

Ten parts of 2-methyl-4-α-benzofuryl thiazole and 9.3 parts of ethyl-p-toluene sulfonate were heated together for 3 hours at 140° C. The product was then mixed with a small quantity of absolute alcohol, 6.5 parts of pentadiene dianil hydrochloride and 7 parts of triethylamine. The mixture was heated to reflux until a purple-blue color formed. The solution was then cooled to crystallize the dye which was removed from solution, washed with cold alcohol and then recrystallized twice from hot alcohol. The product gives a blue-green solution in alcohol and crystallizes to form green crystals thought to have the following formula:

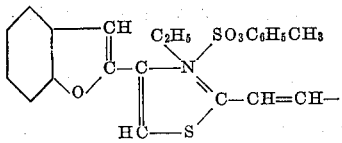

Example XI

Ten parts of benzofurylaceto acetic ester (prepared by reacting the sodium salt of salicylaldehyde with gamma-brom aceto acetic ester) were mixed with 63 parts of carbon disulfide. The mixture was cooled with stirring and a solution of 7 parts of bromine in 63 parts of carbon disulfide added dropwise thereto. After the addition of the bromine solution was completed, the carbon disulfide was removed by evaporation and the residue dissolved in 97.5 parts of absolute ethanol. The solution was heated to reflux and 3.25 parts of thioacetamide added dropwise with stirring. After reaction had ceased the alcohol was removed by evaporation and the residue washed with dilute sodium carbonate solution. Sparkling yellow crystals were obtained thought to correspond to the following formula:

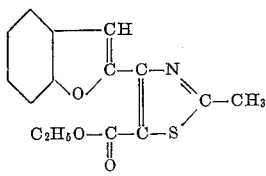

Example XII

Ten parts of 2-methyl-4-α-benzofuryl-5-carbethoxy thiazole and 4.3 parts of dimethyl sulfate are mixed together and heated at 130° C. on an oil bath until a green color was formed. The product is then mixed with 50 parts of ethyl alcohol, 10.2 parts of 2-methyl-mercaptoquinoline ethbromide and 5 parts of triethylamine. The mixture is heated to reflux for 5 minutes. A dye is formed and crystals separated from the solution on cooling. The crystals were removed by filtration, washed with water and recrystallized several times from alcohol and ether. The product is obtained in the form of reddish crystals with the following probable formula:

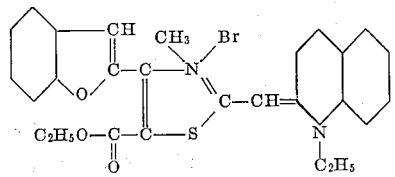

Example XIII

Ten parts of 2-methyl-4-α-benzofuryl-5-carbethoxy thiazole and 4.3 parts of dimethyl sulfate are mixed together and heated at 130° on an oil bath until the mixture turns light green. The product is then mixed with 75 parts of dry pyridine and 9.6 parts of ethyl-ortho-formate. The mixture is heated to reflux for 15 minutes, cooled and treated with an excess of saturated potassium iodide solution. Crystals are formed which are removed from solution by filtration, recrystallized from alcohol and dried. Crystals are obtained of the dye of the formula:

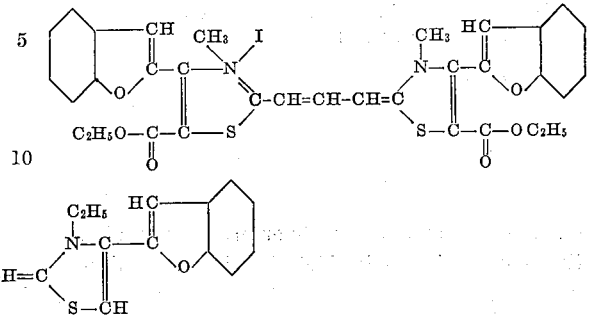

The above described bases which contain a reactive methyl group in the alpha position to the thiazole nuclei can be converted to novel quaternary salts by reaction with a quaternary salt-forming compound containing an acid radical and a hydrocarbon radical. They may be prepared, for example, by reacting the base with a suitable ester, e. g., an alkyl, hydroxyalkyl or aralkyl ester of a suitable anion, for example, halogen, sulfate, nitrate, perchlorate, p-toluene sulfonate, etc. Any of said or equivalent salts can be employed in the dye condensation reactions described. The salts may be made prior to dye condensation or simultaneously therewith.

The new quaternary cyclammonium salts of the present invention can be employed in the preparation of unsymmetrical simple cyanine dyes by condensing said salts in the presence of a basic condensing agent such as trialkylamine, sodium acetate, sodium ethylate, sodium carbonate, triethanolamine or n-methyl piperidine with a suitable alkyl or arylmercapto compound such as 1-methyl or 1-ethyl-mercapto quinoline, -benzothiazole, -benzoxazole, -benzselenazole, -naphthiazole, -naphthoxazole compound, etc.

Iso cyanine dyes can be prepared by reacting the salts of the present invention with quinoline quaternary salts in the presence of a basic condensing agent. In such dyes the linkage is through the 4-position of the quinoline ring.

Dicarboyanine dyes unsubstituted in the methine chain can be prepared from the new quaternary salts by condensing them with a compound of the following general formula:

$$R-N=CH-CH=CH-NHR \cdot HX$$

where R is an aryl group and X is an acid radical. Hydrohalides of β-anilinoacrolein anil are particularly useful. The condensation reactions may be carried out in the proportion of two molecules of quaternary salt to one molecule of anil in the presence of basic condensing agents. Unsymmetrical dyes are obtained by varying the types of quaternary salts employed, e. g., by using one mol of one of the new salts of this invention and one mol of a different quaternary salt having a reactive methyl group.

Tetracarbocyanine dyes may be obtained by condensing the new quaternary salts alone or with other known cyclammonium compounds by reacting them with 4-acetoxy or benzoxy-delta-3, 5 - heptadiene - 1, 7 - dial - di - tetraquinolide acid salts. Pentacarbocyanines may be obtained in similar reactions employing 4-acetoxy or benzoxy-delta-3,5,7-nonatriene-1,9-dial ditetrahydroquinolide acid salts. The mentioned intermediates are described in Berichte der Deutschen Chemischen Gesellschaft (67), 1274 (1934).

The above types of cyanine dye condensations may be readily employed to give unsymmetrical dyes by condensing one or more molecular equivalents of an intermediate of the invention with one or more molecular equivalents of some other heterocyclic nitrogen compound such as is commonly employed in cyanine dye reactions. More specifically, the alpha methyl substituents of alpha and beta thionaphthenothiazoles may be used in cyanine condensations in company with any heterocyclic base of the following general formula:

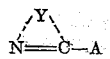

where A represents a reactive group capable of entering into cyanine dye condensations, wherein Y represents the non-metallic atoms necessary to complete a 5-membered heterocyclic nucleus, for example, a 5-membered heterocyclic nucleus containing two nuclear non-metallic atoms other than carbon, one of which non-metallic atoms is trivalent nitrogen and the other a divalent non-metallic atom such as oxygen, sulfur, selenium, etc. By heterocyclic nucleus it is intended to include both substituted and unsubstituted heterocyclic rings described, for example: thiazoles, benzthiazoles, benzoxazoles, naphthiazoles, iminazoles, dialkylindolenines, anthracenothiazoles, etc. Y may also represent the non-metallic atoms necessary to complete a six-membered heterocyclic nucleus such as a six-membered heterocyclic nucleus containing but one nuclear non-metallic atom other than carbon as, for example, pyridine, quinoline, or naphthquinoline.

Heterocyclic compounds capable of reacting to form merocyanine dyes may be reacted with the dye intermediate of the present invention to form a new class of merocyanine dyes containing a benzofuryl thiazole nucleus.

To be more specific, the novel dye intermediates in salt form may be condensed with a compound of the formula:

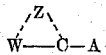

where A is a reactive group capable of entering into cyanine dye condensations, e. g., an intracyclic reactive methylene group, and where W is either $=C=S$, $=C=Se$, $=C=Te$, or $=C-O$ and Z represents the non-metallic atoms necessary to complete a 5-membered heterocyclic nucleus containing two nuclear non-metallic atoms other than carbon, at least one of which is trivalent nitrogen and another of which is divalent when other than nitrogen, i. e., a thiazolone, an oxazolone, an imidazolone, a pyrazolone, etc., for example, compounds such as rhodanines, a 2-thio-2,4(3,5) oxazoledione nucleus, hydantoins and nitrogen-substituted derivatives, pyrazolones and thiopyrazolones; in addition, X represents the non-metallic atoms necessary to complete a six-membered heterocyclic nucleus, for example, a six-membered heterocyclic nucleus containing two nuclear trivalent nitrogen atoms and four nuclear carbon atoms such as barbituric acids. The above-mentioned merocyanine dyes may then be converted into more complex dyes by utilizing the quaternarization and condensation reactions described in British Patents 489,335 and 487,051.

Polymeric cyanine dyes from intermediates of the present invention may also be prepared particularly by the process of Wilson U. S. Patent 2,425,772. To be more specific, the novel bases may be converted into dimeric quaternary salts and dye condensed in manners similar to those described in the working examples of that patent.

In place of the specific ortho esters of carboxylic acids may be substituted any ester of this type which is capable of reacting with the heterocyclic nitrogen compounds. Suitable esters include trimethyl ortho-propionate, methyl-diethyl n-caproate, methyl-diethyl ortho-isocaproate, trimethyl ortho-valerate, trimethyl ortho-formate, trimethyl ortho-benzoate, trimethyl ortho-p-toluene, trimethyl ortho - gamma - phenoxy - butyrate, trimethyl ortho-phenyl-acetate.

The novel cyanine dyes described above have been found to have valuable sensitizing properties when used in conjunction with light sensitive photographic emulsion. They have been found to confer an extra range of sensitivity to light sensitive gelatino-silver halide emulsions imparting thereto unusual color sensitivity particularly in the green and red region of the spectrum. They are compatible with cyanine, pseudocyanine, carbocyanine cyazine and merocyanine dyes in general and may be admixed therewith to form novel emulsions. Moreover, they may be used in conjunction with immobile, or non-diffusing dye intermediates including color formers which are used in processes of color photography involving color coupling development steps and/or azo coupling steps. To be more specific, they may be used with phenols, naphthols, pyrazolones, acylacetic acid esters and amides and the like such as those described in U. S. Patents 2,166,181, 2,179,228, 2,179,234, 2,179,239, 2,186,734, 2,186,849, 2,294,909, 2,200,924, and 2,297,732 and in accordance with the processes described in such patents.

The dyes of the present invention are preferably dispersed in the emulsion which it is desired to sensitize or in a colloid layer immediately adjacent thereto. In general, the dye is dissolved in some suitable solvent such as methanol, ethanol or acetone and added to the emulsion ready for pouring in a concentration of from 0.1 to 100 milligrams per liter of emulsion. The concentration of dye to be employed will vary according to the light-sensitive material and according to the particular dye. The most effective concentration will be readily determined by those skilled in the art according to known and customary procedures. For most dyes, 10 to 50 milligrams per liter will be preferred although some dyes having long methine chains such as tri-, tetra and pentacarbocyanines may be used in much smaller quantities, e. g., from 0.1 to 2 or more milligrams per liter. In addition to being employed in or adjacent to photographic layers, the dyes of the invention may also be used to impart extra sensitivity by bathing films or plates in solutions of the dyes dissolved in suitable solvents. The present invention also embraces silver salts dyed with the dyes of the described type. Although the dyes have been described as being incorporated particularly in gelatino silver halide layers, carrier layers other than gelatin may be employed; for example, light-sensitive silver salts dispersed in collodion, water-swellable cellulose esters, ethers and synthetic resins, albuminous colloids, etc.

In addition to their use as sensitizing agents for silver halide emulsions, the dyes of the present invention may also be employed as screening or filter dyes in multi-layer films or as antihalation dyes in backing layers.

The novel sensitizing dyes forming one aspect of this invention have advantages over known dyes in that silver halide containing the same have increased spectral sensitivity. Thiazolo cyanine type dyes have been known in the art for some time which contain alkyl or aryl substituents in the 4- and/or 5-position. A comparison has been made between the most closely analogous of these dyes and certain dyes of the present invention. All test films were prepared from portions of an ordinary gelatine iodobromide emulsion and equivalent concentrations of dyes were used in each case.

As many apparently widely different embodiments of this invention may be made without departing from the spirit and scope thereof, it is to be understood that the invention is not to be limited except as defined by the claims.

What is claimed is:

1. A cyanine dye of the general formula

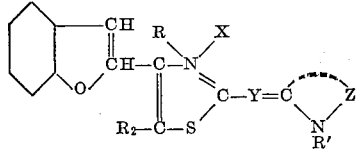

wherein $R_2$ is a member taken from the group consisting of hydrogen, alkyl, aryl and carbethoxy groups, R and R' are hydrocarbon radicals taken from the group consisting of alkyl and aralkyl radicals, X is a negative radical of an acid, Y is trivalent bridging radical taken from the group consisting of —CH=, —CH=CH—CH=, —CH=CR$_3$—CH=, and
—CH=CH—CH=CH—CH=CH—CH=,
where $R_3$ is a hydrocarbon radical taken from the group consisting of alkyl and aryl and Z constitutes the atoms necessary to complete a heterocyclic nitrogen nucleus of the type contained in cyanine dyes.

2. A cyanine dye of the general formula

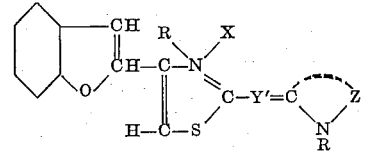

wherein R is an alkyl radical, X is the negative radical of an acid, Y' is a trimethine radical and Z constitutes the atoms necessary to complete a heterocyclic nitrogen nucleus of the type contained in cyanine dyes.

3. A cyanine dye of the formula

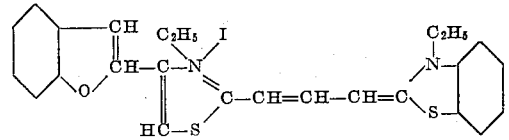

4. A cyanine dye of the formula

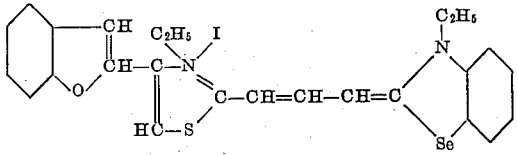

EDMUND B. MIDDLETON.

REFERENCES CITED

The following references are of record in the file of this patent:

UNITED STATES PATENTS

| Number | Name | Date |
| --- | --- | --- |
| 2,304,112 | Middleton | Dec. 8, 1942 |